United States Patent
Peer et al.

(10) Patent No.: US 10,464,433 B2
(45) Date of Patent: Nov. 5, 2019

(54) METHOD FOR ASCERTAINING POSITIONAL DATA DESCRIBING A POSITION OF A MOTOR VEHICLE RELATIVE TO A STATIONARY CHARGING DEVICE AS A DESTINATION, AND ARRANGEMENT CONSISTING OF A MOTOR VEHICLE AND A STATIONARY CHARGING DEVICE AS A DESTINATION

(71) Applicant: AUDI AG, Ingolstadt (DE)

(72) Inventors: Reinhard Peer, Gaimersheim (DE); Matthias Hardt, Neubiberg (DE)

(73) Assignee: AUDI AG, Ingolstadt (DE)

( * ) Notice: Subject to any disclaimer, the term of this patent is extended or adjusted under 35 U.S.C. 154(b) by 11 days.

(21) Appl. No.: 15/757,801

(22) PCT Filed: Sep. 15, 2016

(86) PCT No.: PCT/EP2016/001552
§ 371 (c)(1),
(2) Date: Mar. 6, 2018

(87) PCT Pub. No.: WO2017/045758
PCT Pub. Date: Mar. 23, 2017

(65) Prior Publication Data
US 2018/0244168 A1    Aug. 30, 2018

(30) Foreign Application Priority Data
Sep. 19, 2015    (DE) .................. 10 2015 012 368

(51) Int. Cl.
*B60L 53/36* (2019.01)
*B60L 11/18* (2006.01)

(52) U.S. Cl.
CPC ........... *B60L 11/1833* (2013.01); *B60L 53/36* (2019.02); *Y02T 90/125* (2013.01)

(58) Field of Classification Search
CPC ...... B60L 11/1833; B60L 53/36; B60L 53/39; B60L 53/60; Y02T 90/12; Y02T 90/125
(Continued)

(56) References Cited

U.S. PATENT DOCUMENTS

2007/0299623 A1  12/2007  Gandelsman et al.
2011/0199028 A1  8/2011  Yamazaki et al.
(Continued)

FOREIGN PATENT DOCUMENTS

DE    102008004474 A1    7/2009
DE    102009033239 A1    1/2011
(Continued)

OTHER PUBLICATIONS

Examination Report dated May 24, 2016 of corresponding German application No. 102015012368.8; 5 pgs.
(Continued)

*Primary Examiner* — Edward Tso
*Assistant Examiner* — Aaron Piggush
(74) *Attorney, Agent, or Firm* — Maier & Maier, PLLC

(57) ABSTRACT

A method for ascertaining positional data describing a position of a motor vehicle relative to a stationary charging device as a destination. At the charging device end, a plurality of electromagnetic transmission signals are emitted from respectively different transmitting positions that are arranged in a transmitting position pattern and have respectively at least one signal characteristic that can be differentiated by the motor vehicle during reception. After which, for each reception signal received, signal strength data that describe its reception strength are produced, and the positional data are determined from the data, taking into consideration transmitter information describing the transmitting position pattern and an assignment of the transmitting positions to the signal characteristics.

11 Claims, 1 Drawing Sheet

(58) Field of Classification Search
USPC .......................................... 320/104, 109, 155
See application file for complete search history.

(56) References Cited

U.S. PATENT DOCUMENTS

| | | | |
|---|---|---|---|
| 2014/0035526 A1 | 2/2014 | Tripathi et al. | |
| 2016/0178740 A1* | 6/2016 | Sieber | G01S 13/04 342/43 |
| 2017/0174093 A1* | 6/2017 | Oettle | B60L 53/65 |

FOREIGN PATENT DOCUMENTS

| | | |
|---|---|---|
| DE | 102010012356 A1 | 9/2011 |
| DE | 102011083427 A1 | 3/2013 |
| DE | 102012023708 A1 | 6/2014 |
| DE | 102013208678 A1 | 11/2014 |
| DE | 102013110280 A1 | 3/2015 |
| EP | 2727759 A1 | 5/2014 |
| JP | 2012-34546 A | 2/2012 |
| WO | 2014023651 A1 | 2/2014 |

OTHER PUBLICATIONS

International Search Report dated Feb. 1, 2017 of corresponding International application No. PCT/EP2016/001552; 14 pgs.
Translation of the International Preliminary Report on Patentability dated Mar. 29, 2018 of corresponding International application No. PCT/EP2016/001552; 7 pgs.
Communication pursuant to Article 94(3) EPC dated Jun. 28, 2019, in corresponding European patent application No. 16766485.3 including partial machine-generated English language translation; 8 pages.

* cited by examiner

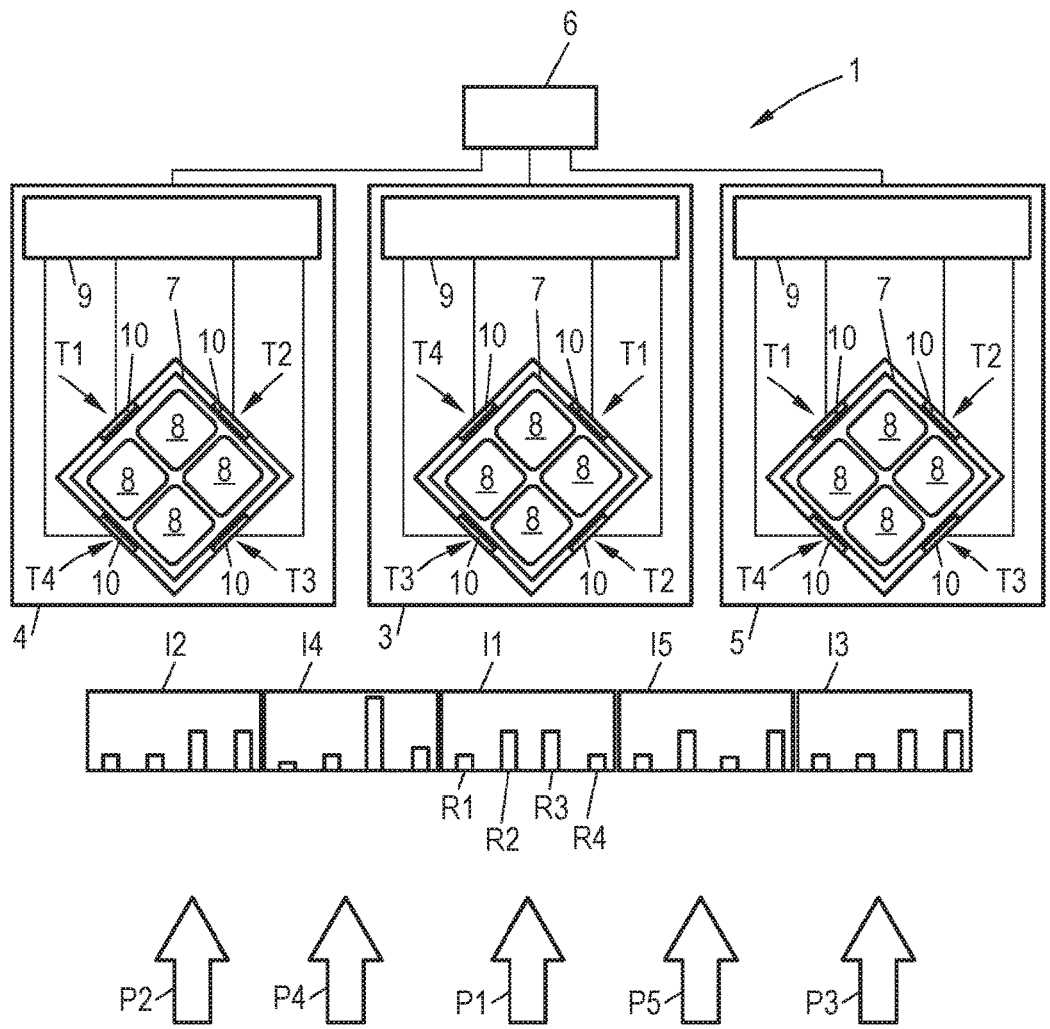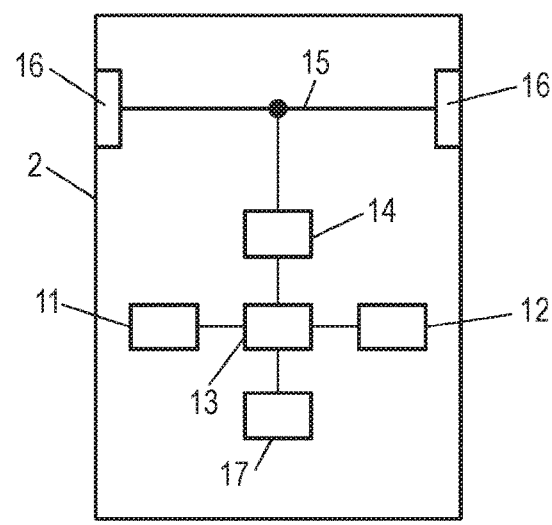

METHOD FOR ASCERTAINING POSITIONAL DATA DESCRIBING A POSITION OF A MOTOR VEHICLE RELATIVE TO A STATIONARY CHARGING DEVICE AS A DESTINATION, AND ARRANGEMENT CONSISTING OF A MOTOR VEHICLE AND A STATIONARY CHARGING DEVICE AS A DESTINATION

FIELD

The invention relates to a method for ascertaining positional data describing a position of a motor vehicle relative to a stationary charging device as a destination. In addition, the invention relates to an arrangement consisting of a motor vehicle and a stationary charging device as a destination.

BACKGROUND

The charging of electric energy storage systems of motor vehicles by a charging device that is arranged in or on a surface to be traveled over typically requires an exact fine positioning on the order of centimeters in order, for example, to attain an efficiency that is as high as possible during an inductive energy transmission. By way of methods of the kind mentioned in the introduction, autonomously guided vehicle systems are intended to assist drivers or the motor vehicle at least in part when the motor vehicle is aligned with respect to the charging device as a destination, this necessitating the determination of positional data that describes this relative position and is as precise as possible. For this purpose, it has already been proposed to transmit, via the primary coil, an additional low-energy signal, which serves for the fine positioning, or to emit, via an auxiliary antenna at the charging device end, a signal that carries a digital identification code. Likewise, it is known to emit from the vehicle a signal that is received by a plurality of antennas at the charging device end and is analyzed for ascertaining the positional data.

DE 10 2013 110 280 A1 describes a position determination system for a vehicle that can be charged by means of an inductive energy transmission system, wherein additional coils and/or antennas are arranged in a stationary manner, wherein an additional primary-end coil and/or antenna form or forms a primary-end transmitter and at least one additional coil and/or antenna that is arranged at the vehicle form or forms at least one receiver for reception of the signals of at least one primary-end transmitter. For this purpose, at least two receivers and/or at least two transmitters are present, so that the position determination system determines, by means of the transmission signals of the additional coils or antennas, the distance and/or the alignment of the vehicle relative to the primary-end energy transmission device in a stationary arrangement.

DE 10 2013 298 678 A1 discloses a system for alignment of a motor vehicle, comprising a transmitting device that is arranged at a stationary device for emission of electromagnetic waves and a receiving device that is arranged at the vehicle and has at least two receiving units for the detection of electromagnetic waves emitted by the transmitting device. It is hereby provided that the transmitting device comprises at least two transmitting units that are spaced apart, wherein an analysis device is designed for the purpose of calculating an angle between a reference axis of the vehicle and the stationary device on the basis of the distance and orientation of the at least two transmitting units with respect to the at least two receiving units.

When coils are used, methods and systems of this kind are extremely prone to interference because of their small range or on account of overlapping signals when additional transmitting units are used in their vicinity.

SUMMARY OF THE DISCLOSURE

The invention is consequently based on the object of presenting a possibility for ascertaining positional data describing a position of a motor vehicle relative to a stationary charging device as a destination, said positional data being less prone to interference due to external influences.

This object is achieved in accordance with the invention by a method for ascertaining positional data describing a position of a motor vehicle relative to a stationary charging device as a destination, wherein, at the charging device end, a plurality of electromagnetic transmission signals are emitted by respectively different transmitting positions, which are arranged in a transmitting position pattern, and each transmission signal has at least one signal characteristic that can be differentiated by the motor vehicle during reception, after which, for each signal received, signal strength information describing its received signal strength is generated and, from it, taking into consideration transmitter information describing the transmitting position pattern and an assignment of the transmitting position to the signal characteristics, the positional data are determined.

The invention is based on the idea of analyzing the reception strengths of transmission signals, each of which is emitted from a different transmitting position, or, in other words, of analyzing a reception strength profile and, with a knowledge of the transmitting position pattern and of the assignment of transmitting positions and signal characteristics, of determining from them their relative position. It is therefore of central importance that the signal characteristics are chosen in such a way that a receiving device that is to be provided at the vehicle end can differentiate between received signals in terms of their signal characteristics. Depending on the ratio of the signal strengths of the received signals described by the signal strength data, it is possible in this way to determine the relative position of the motor vehicle. In other words, the ratio of the reception strengths with respect to each individual signal characteristic correlates with the alignment of the motor vehicle with respect to the charging device, as a result of which the positional data can be calculated. It is especially preferred when the different transmitting positions are created by correspondingly arranged antenna units of a transmitting device at the charging device end. The antenna units can provide transmitter coils as antennas.

The method according to the invention accordingly has the advantage that, in comparison to conventional methods, which transmit additional data concerning the magnetic field of the charging device, a substantially greater transmission range that is free of interference can be achieved due to the utilization of electromagnetic waves and, in particular, therefore, of radio waves. Moreover, through appropriate choice of the signal characteristics, it is possible to compensate for any interference due to overlap effects of other signals, because, due to the plurality of transmitting positions with different signal characteristics, redundant data are acquired. Overall, the method thus makes possible an operation with substantially less interference.

In the method according to the invention, it is especially preferred when transmission signals that differ in terms of their frequency, as a signal characteristic, are emitted. The individual frequencies for each transmitting position are thus chosen in such a way that their signals can be separated sufficiently precisely from one another by filters at the receiving device end so that the ability to differentiate them is ensured. It is thus possible especially advantageously to determine the positional data by way of a sufficiently broadbanded receiver for all provided frequencies of the transmission signals with, at the receiver end, solely one antenna that is suitable for all frequencies. At the charging device end, it is possible, for example, to use the same type of antenna units with sufficiently broad-banded emission characteristics.

Alternatively or additionally, it is also possible for signals that differ in terms of their polarization to be emitted. In this case, the ability to differentiate the signal characteristics is achieved by the polarization damping of the individual transmission signals, wherein, both at the receiver end and at the transmitter end, a correspondingly polarized emitting antenna unit is to be provided for each signal characteristic. For example, the ability to differentiate four transmission signals is achieved through the choice of horizontal, vertical, levorotatory, and dextrorotatory polarization.

In addition, it is alternatively or additionally conceivable that transmission signals are emitted that differ in terms of their period of emission in a transmission pattern over time, as a signal characteristic. It is thereby possible, both at the receiver end and at the transmitter end, to use solely one type of antenna, wherein the individual transmission signals are emitted in succession at intervals in time at one frequency and can be differentiated by way of their respective period of emission. Obviously, it is possible in this case, for example, to mark the beginning or the end of the transmission pattern by pilot signals or transmission pauses.

Moreover, it is especially advantageous for the avoidance of interference effects between the individual transmission signals when the transmission signals are emitted in a frequency range between 30 kHz and 3 MHz. Consequently, the utilization of the long wavelength range and/or the very low frequency range (LW or VLF) is proposed.

In the method according to the invention, it is additionally appropriate when at least four, in particular exactly four, transmitting positions are used. In this way, when two respective transmitting positions are located on intersecting straight lines of the transmission pattern, it is possible in an especially simple manner to determine relative positions in two spatial directions. The use of exactly four transmitting positions makes possible such an effect at the lowest possible expense in terms of material. It is especially appropriate here when, as a transmitting position pattern, corner points of a square are used. Such a uniform distribution makes possible the best resolution with respect to the two spatial directions when four transmitting positions are used.

In the method according to the invention, it is especially preferred when at least one other charging device is present, which, in turn, emits transmission signals from transmitting positions of the same transmitting position pattern, wherein directly adjacent other charging devices have different assignments of the transmitting positions to the signal characteristics, wherein, as received signals, overlapping transmission signals of the charging device are received and positional data describing additionally the assignment of the at least one other charging device and a relative position of the transmission pattern of the charging device(s) are used. Such a case is given, for example, for parking spaces arranged next to one another, each with a charging device, wherein the motor vehicle is to be driven toward one of them. Overlaps of the transmission signals therefore do not act as interferences, but rather are also taken into consideration in determination of the relative position. For this purpose, directly adjacent other charging devices have a different assignment of the transmitting positions to the signal characteristics, said assignment being known during determination of the positional data, so that, on the basis of the reception strength resulting from the overlaps, the position of the motor vehicle relative to the charging device as a destination can be determined. Advantageously, it is possible in this way to arrange a plurality of charging devices adjacent to one another and to operate them in parallel. Avoided in this way are not only interferences between the transmission signals of the charging devices, but also the overlap effects are utilized for an improved positional determination without additional effort and expense.

It is therefore especially preferred when, for each two directly adjacent charging devices, an assignment of their transmitting position to the signal characteristics that is rotated by a predetermined angle is used. This relates to positional patterns, in particular, that are projected onto themselves by a rotation, in particular the aforementioned transmitting position pattern in the form of corner points of a square. Appropriately, the angle of rotation is 90°.

In the method according to the invention it is especially advantageous when the transmission power of the transmission signals is chosen in such a way that the signal characteristics thereof can be differentiated by the motor vehicle at a separation of at most 24 m, preferably at most 12 m, especially preferably at most 6 m, with respect to the respective transmitting position. In this way, it is possible at little expense for transmission power to realize suitable near-range applications for the fine positioning of the motor vehicle, wherein the aforementioned distances are greater than those than can be achieved in the case of a coil-based transmission of the signals that serve for positioning.

Finally, in the method according to the invention, it is especially preferred that, at the motor vehicle end, a driver information device is used, which outputs to a driver of the motor vehicle a driving maneuver that depends on the positional data and has to be executed in order to attain a predetermined position and/or alignment with respect to the charging device as a destination. For this purpose, the driver information device can have, for example, an optic and/or acoustic and/or haptic output device, which outputs the instructions, perceivable by the driver, for the steering and/or braking and/or accelerating actions that are to be undertaken. Alternatively or additionally, it can be provided that, at the motor vehicle end, a vehicle guide device is used that influences a transverse and/or longitudinal guiding of the motor vehicle, which, taking into consideration the positional data, implements a driving maneuver that is to be executed for attaining a predetermined position and/or alignment with respect to the charging device as a destination. Vehicle guide devices of this kind are known, for example, from backup parking devices, which can be provided in the motor vehicle without anything further, so that said devices make possible an automatic approach toward the charging device without additional expense in terms of design.

In addition, the invention relates to an arrangement of a motor vehicle and a stationary charging device as a destination, wherein, at the charging device end, a transmitting device for emission of electromagnetic transmission signals form respectively different transmitting positions, each of which is provided with a signal characteristic that can be differentiated by a receiving device provided at the motor vehicle end, wherein a control device designed for implementing the method according to the invention is provided.

In the arrangement according to the invention, it is especially appropriate when the charging device comprises a primary-end induction charging device, wherein the motor vehicle has a secondary-end induction charging device for receiving electrical energy from the primary-end induction charging device. This makes possible an especially comfortable charging of the motor vehicle without any contact, wherein the positional overlap required for inductive energy transmission can be realized with a precision on the order of centimeters. Moreover, in the case of the primary-end induction charging device, it can be provided that it has a plurality of induction charging units, which can be actuated individually by the control device, depending on the properties of the secondary-end induction charging device, in such a way that a transmitting magnetic field is generated, which can be adapted to different secondary-end coil geometries of charging devices at the vehicle end. More preferably, four induction charging units are provided, which are arranged in the corner points of a conceptual square, wherein a likewise square transmitting position pattern is used, which is arranged displaced by 45° surrounding the induction charging units. In this way, it is possible to create an especially space-saving arrangement. Obviously, the primary-end induction charging devices and the secondary-end induction charging device can also be used in the scope of the method according to the invention.

Moreover, all embodiments relating to the method according to the invention can be extended to the arrangement according to the invention, consisting of a motor vehicle and of a stationary charging device as a destination, so that the respectively mentioned advantages can also be achieved with them.

BRIEF DESCRIPTION OF THE DRAWING

Further advantages and details of the invention ensue from the exemplary embodiment described below as well as on the basis of the drawing(s).

FIG. 1 shows an exemplary embodiment of a method for ascertaining positional data describing a position of a motor vehicle relative to a stationary charging device as a destination.

DETAILED DESCRIPTION OF THE DRAWING

FIG. 1 shows an exemplary embodiment of an arrangement 1 consisting of a motor vehicle 2 and of a stationary charging device 3 as a destination, wherein two other, directly adjacent charging devices 4 and 5 are part of the arrangement 1. In addition, the arrangement 1 has, at the charging device end, a control instrument 6, which also belongs to the arrangement 1.

Each charging device 3, 4, 5 comprises a primary-end induction charging device 7 with four induction charging units 8, which can be actuated individually, and a transmitting device 9 with four antenna units 10. Said antenna units define transmitting positions for transmission signals that are to be emitted by the transmitting device 9, wherein the transmitting positions are arranged in a transmitting position pattern that corresponds to the corner points of a square. With respect to these transmitting positions, the induction charging units 8, which are likewise arranged in a square pattern, are arranged at a displacement of 45° and consequently diagonally.

The motor vehicle 2 has a secondary-end induction charging device 11 and a receiving device 12, which can be actuated by a control instrument 13 of the motor vehicle 2. In addition, the motor vehicle 2 comprises a vehicle guide device 14, which acts on a steerable axle 15 with two wheels 16 for transverse and longitudinal guiding of the motor vehicle 2. Obviously, alternatively or additionally, the vehicle guide device 14 can also act on a non-steerable but drivable additional axle (not shown) of the vehicle 2. Further provided is a driver information device 17, which outputs by means of an output unit, which is not shown, acoustic and/or optic and/or haptic data to a driver of the motor vehicle 2 for executing a driving maneuver. Both the vehicle guide device 14 and the driver information device 17 can be actuated by the control instrument 13.

The control instruments 6, 13 form a control device of the arrangement 1, which is designed for implementing a method for ascertaining positional data describing a position of the motor vehicle 2 relative to the stationary charging device 3 as a destination. For this purpose, it is to be noted that, in particular, the secondary-end induction charging device 11 and the receiving device 12 are solely illustrated schematically with respect to their spatial arrangement in the motor vehicle 2, so that the positional data refers to an overlap with the primary-end induction charging device 7 of the charging device 3 that is targeted in accordance with the size and position of the secondary-end induction charging device 11. The method is described below:

In a first step, respectively, four transmission signals, which differ from one another, are emitted from the transmitting devices 9 of the charging devices 3, 4, 5. They each have a different signal characteristic T1 to T4 in the form of different frequencies in the ultra-long-wavelength range and/or long-wavelength range, that is, between 30 kHz and 3 MHz. A different transmission signal is emitted here from each transmitting position defined by the antenna units 10. For the charging device 3 as a destination, the signal characteristics T1 to T4, beginning for the antenna unit 10 illustrated at the upper right, are arranged clockwise in the sequence T1, T2, T3, T4, whereas, for the adjacent charging devices 4, 5, this sequence is T2, T3, T4, T1. Consequently, for all charging devices 3, 4, 5, the assignment of the signal characteristics T1 to T4 to the transmitting positions has the same transmitting position pattern, wherein the assignment to the signal characteristics T1 to T4 of the adjacent charging device 4, 5 is rotated by 90° counterclockwise in comparison to the charging device 3 as a destination. It should hereby be noted that receiving device 12 at the motor vehicle end is designed such that it can receive all frequencies of the transmission signal by way of a sufficiently broad-banded and band-selective receiver and differentiate them from one another.

In a next step, received signals with the signal characteristics T1 to T4 are received by the receiving device 12 and signal strength data I1 are generated, which are symbolized in the FIGURE by a diagram. In the present case, the motor vehicle 2 moves in the direction of an arrow P1 toward the charging device 3. For the signal characteristic T1, a reception strength R1 and, for the signal characteristic T2, a reception strength R2, etc. are determined here, said reception strengths being described by the signal strength data I1. In other words, the data describe a reception strength profile. Because the transmitting positions assigned to the signal characteristics T1 and T2 lie nearer to the motor vehicle than those that are assigned to the signal characteristics T1 to T4, reception strengths R2 and R3 that are greater than R1 and R4 are detected. It should be noted here that all reception strengths R1 to R4 are illustrated solely in a purely qualitatively manner for highlighting their ratios to one another.

The reception strengths may also be referred to as a received signal strength indication (RSSI).

It can be seen that the motor vehicle 2 moves in the direction of the arrow P1 exactly toward the charging device 3 as a destination, whereas, for travel in the direction of an arrow P2 or P3, the adjacent charging device 4 or the charging device 5, respectively, would be approached. Signal strength data I2, I3 that result thereby (for which the reception strengths R1 to R4 are illustrated in the same sequence as for I1) correspond to those of I1, wherein, on account of the different transmitting positions of the transmission signals with the signal characteristics T3, T4 in relation to the motor vehicle 2, the reception strengths R3, R4 are more strongly pronounced than the reception strengths R1, R2.

By way of the arrows P4, P5, a conceptual travel of the motor vehicle 2 in the direction of an undesired intermediate position, in which there is no overlap between the induction charging devices 7 and 11, will be described. The signal strength data I4 and I5 associated with the arrows P4 and P5 show a reception strength profile that is markedly different from the transmission signal data I1 to I3. For travel in the direction of the arrow P4, the signal positions of the charging devices 3, 4 that are associated with the signal characteristic T3 lie very near to the motor vehicle, so that they do not overlap and produce a very high reception strength R3 at the receiving device 12. The reception strengths R2 and R4 are determined here largely by the transmission signals, the reception position of the charging device 4 associated with the signal characteristic T2, and the transmitting position of the charging device 3 associated with the signal characteristic T4, so that they are more weakly pronounced than the reception strength R3. Received signals having the signal characteristic T1 are emitted only from transmitting positions that are very far remote, so that, in spite of the overlap, only a very small reception strength R1 is adjusted. In analogy thereto, the signal strength data I5 associated with the arrow P5 describe a stronger reception strength R2 and R4 than the reception strengths R1 and R3.

In a subsequent step, the positional data are determined by the control instrument 13 from the signal strength data, wherein the transmitting position pattern, the assignment of the transmitting positions to the signal characteristics T1 to T4 of all charging devices 3, 4, 5, and a position of the transmitting position pattern of the charging devices 3, 4, 5 relative to one another are taken into account. Owing to the fact that the latter-mentioned data are known to the control instrument 13, it is possible by analysis of the transmission signal data I1, in particular, the reception strength profile thereof, to conclude that the motor vehicle 2 is moving in a correct direction toward the charging device 3 as a destination. If, in contrast, other reception strength profiles, such as those described, for example, by the signal strength data I2 to I5, are analyzed at the motor vehicle end, then the control instrument 13 identifies a corresponding wrong alignment with respect to the charging device 3 as a destination and determines correspondingly different positional data. This applies analogously when, instead of the charging device 3, one of the charging devices 4, 5 is to be approached as a destination.

In a further step, the control instrument 13 controls the vehicle guide device 14 for executing a driving maneuver, which, taking into consideration the positional data, is required for attaining a predetermined position and alignment with respect to the charging device 3 as a destination. The motor vehicle 2 is consequently guided automatically toward the charging device 3 as a destination, so that the primary-end inductive charging device 7 and the secondary-end inductive charging device 11 are brought into overlap.

In a step that, in particular, is to be carried out at the same time, the control instrument 13 actuates the driver information device 17 for output of driver information that describes a driving maneuver that is to be executed for attaining the predetermined position and/or alignment with respect to the charging device 3 as a destination. It this case, it is possible, for example, on an output device in the form of an instrument panel of the motor vehicle 2—to indicate, by way of displayed arrows and emitted sounds, a change in the steering direction to be executed by the driver until the primary-end induction charging device 7 and the secondary-end induction charging device 11 are brought into overlap. Obviously, it is possible, depending on a specific equipping of the motor vehicle 12, for a completely automatic transverse and longitudinal guiding or solely either a transverse or a longitudinal guiding to occur by the vehicle guide device 14, wherein, by way of the driver information device 17, corresponding data are output relating to the transverse or longitudinal guiding measures that the driver has to carry out. Finally, it is also conceivable that the driver independently carries out the transverse and longitudinal guiding only on the basis of the driver data of the driver information device 17.

Obviously, the method according to the invention can also be implemented for arrangements that have more than three charging devices, wherein transmitting positions are provided in alternation, rotated or else multiply varied.

Finally, it remains to be noted that the induction charging units 8 of the primary-end induction charging devices 7 can be actuated by the control instrument 6 in such a way that a transmitting magnetic field is generated, which is adapted to as many different embodiments of secondary-end induction charging devices as possible.

The invention claimed is:

1. A method for ascertaining positional data describing a position of a motor vehicle relative to a stationary charging device as a destination, comprising:
at a charging device end, a plurality of electromagnetic transmission signals are emitted from respectively different transmitting positions that are arranged in a transmitting position pattern and have respectively at least one signal characteristic (T1-T4) that is differentiated by the motor vehicle during reception, after which, for each reception signal received, signal strength data (I1-I5) that describe its reception strength (R1-R4) are produced by the motor vehicle, and positional data of the motor vehicle relative to the stationary charging device are determined from said signal strength data so that by using the positional data, the motor vehicle is positioned at a predetermined position on the stationary charging device, wherein transmitter information describing the transmitting position pattern and an assignment of the transmitting positions to the signal characteristics (T1-T4) is used in the determination of the positional data.

2. The method according to claim 1, wherein transmission signals that are differentiated in terms of their frequency and/or their polarization and/or their transmission period in a transmission pattern over time are or is emitted as the signal characteristic (T1-T4).

3. The method according to claim 1, wherein the transmission signals are emitted in a frequency range between 30 kHz and 3 MHz.

4. The method according to claim 1, wherein at least four, in particular exactly four, transmitting positions are used.

5. The method according to claim 4, wherein as the transmitting position pattern, corner points of a square are used.

6. The method according to claim 1, wherein at least one other charging device is present, which, in turn, emits transmission signals from transmitting positions of the same transmitting position pattern, wherein directly adjacent charging devices have different assignments of the transmitting positions to the signal characteristics (T1-T4), wherein, as the reception signal, overlapping transmission signals of the charging devices are received and transmission signal data (I1-I5) that describe the assignment of the at least one other charging device and a relative position of the transmitting position pattern of the charging devices are used for determination of the positional data.

7. The method according to claim 6, wherein, for each two directly adjacent charging devices, an assignment of their transmitting positions, which are rotated by a predetermined angle, in particular by 90°, to the signal characteristics (T1-T4) is used.

8. The method according to claim 1, wherein the transmission power of the transmission signals is chosen in such a way that their signal characteristics (T1-T4) can be differentiated by the motor vehicle at a distance of at most 24 m, preferably at most 12 m, more preferably at most 6 m, with respect to the respective transmitting position.

9. The method according to claim 1, wherein at a motor vehicle end, a driver information device is used, which outputs driver information that is dependent on the positional data and describes a driving maneuver that is to be executed for attaining a predetermined position and/or alignment with respect to the charging device, as a destination, to a driver of the motor vehicle and/or a vehicle guide device that influences a transverse and/or longitudinal guiding of the motor vehicle that, taking into consideration the positional data, implements a driving maneuver that is to be executed for attaining a predetermined position and/or alignment with respect to the charging device as a destination.

10. An arrangement comprising:
a motor vehicle and a stationary charging device as a destination, wherein, at a charging device end, a transmitting device for the emission of electromagnetic transmission signals from respectively different transmitting positions, each of which has, at a motor vehicle end, a signal characteristic (T1-T4) that can be differentiated by a provided receiving device, wherein a control device designed for implementation of the method of claim 1 is provided.

11. The arrangement according to claim 10, wherein the charging device comprises a primary-end induction charging device, wherein the motor vehicle has a secondary-end induction charging device for transmission of electrical energy by the primary-end induction charging device.

* * * * *